United States Patent [19]

Inui et al.

[11] Patent Number: 4,494,419
[45] Date of Patent: Jan. 22, 1985

[54] TRANSMISSION MECHANISM IN A MANUAL TRANSMISSION

[75] Inventors: Masaki Inui; Yasuyoshi Yasui, both of Toyota, Japan

[73] Assignee: Toyota Jidosha Kabushiki Kaisha, Aichi, Japan

[21] Appl. No.: 397,442

[22] Filed: Jul. 12, 1982

[30] Foreign Application Priority Data

Aug. 20, 1981 [JP] Japan .................................. 56-131946

[51] Int. Cl.³ .......................... G05G 9/12; G05G 5/10
[52] U.S. Cl. .................................... 74/477; 74/473 R; 74/475
[58] Field of Search ...................... 74/473 R, 475, 477

[56] References Cited

U.S. PATENT DOCUMENTS 3,290,955 12/1966 Keller et al. ....................... 74/477 X
4,377,951 3/1983 Magg et al. ............................ 74/477

Primary Examiner—Allan D. Herrmann
Attorney, Agent, or Firm—Parkhurst & Oliff

[57] ABSTRACT

Disclosed herein is a transmission mechanism in a manual transmission which may eliminate unsmooth movement of the shift fork along the fork shaft during a shift operation so as to improve the feeling of shift-and-select operation. According to the present invention, the shift fork which is selected by the axial movement of the shift-and-select lever shaft is effective to move together with the fork shaft at substantially same speed by the rotation of the lever shaft. For this purpose, the fork shaft is axially movably mounted on the transmission casing and is connected to the lever shaft.

5 Claims, 6 Drawing Figures

TRANSMISSION MECHANISM IN A MANUAL TRANSMISSION

BACKGROUND OF THE INVENTION

This invention relates to a transmission mechanism in a manual transmission.

In a conventional transmission mechanism, a plurality of shift forks are axially movably supported by a fork shaft fixed on the transmission casing. A shift-and-select lever shaft is mounted on the transmission casing and perpendicularly to the fork shaft. Axial movement of the lever shaft permits selective engagement of the engaging member of the lever shaft with one of the shift forks to effect a select operation, and rotation of the lever shaft permits the movement of the shift fork along the fork shaft to effect a shift operation. However, in this transmission mechanism, when the shift fork is moved along the fork shaft by the rotation of the lever shaft at the shift operation, the shift fork is unable to smoothly move along the fork shaft, thereby deteriorating the feeling of the shift-and-select operation.

SUMMARY OF THE INVENTION

Accordingly, it is a primary object of the present invention to eliminate unsmooth movement of the shift fork along the fork shaft at a shift operation and to provide a transmission mechanism in a manual transmission which may improve the feeling of shift-and-select operation.

According to the present invention, the shift fork which is selected by the axial movement of the shift-and-select lever shaft is effective to move together with the fork shaft at the same speed by the rotation of the lever shaft. For this purpose, the fork shaft is axially movably mounted on the transmission casing and is connected to the lever shaft.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
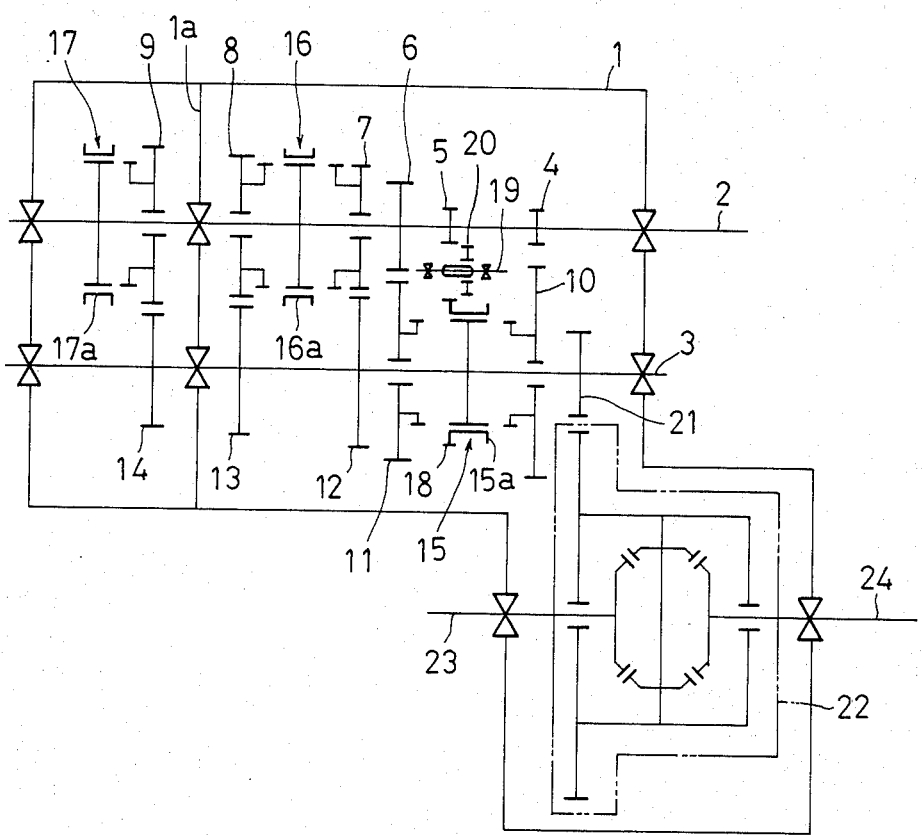
FIG. 1 is a skeltonized diagram of a forward five-speed manual transmission employed in the first preferred embodiment.

Referring now to FIG. 1 which illustrates a skeltonized diagram of a forward five-speed manual transmission employed in this embodiment, a transmission casing 1 is provided with an input shaft 2 and an output shaft 3 which are rotatably arranged in parallel relation with each other. A first speed gear 4, reverse gear 5 and second speed gear 6 are fixed to the input shaft 2 in sequence from the right-hand side as viewed in FIG. 1. A third speed gear 7, fourth speed gear 8 and fifth speed gear 9 are rotatably born by the input shaft 2 in sequence from the right-hand side as viewed in FIG. 1. A counter gear 10 for the first speed gear 4 and another counter gear 11 for the second speed gear 6 are rotatably born by the output shaft 3. The counter gears 10 and 11 can be at all times in meshing engagement with the first speed gear 4 and the second speed gear 6, respectively. Other counter gears 12 to 14 which can be at all times in meshing engagement with the third, fourth and fifth speed gears 7 to 9 are fixed to the output shaft 3. The counter gears 10 and 11 are designed to rotate together with the output shaft 3 by selective connection of such gears with a sleeve 15a of a first clutch mechanism 15. Similarly, the third speed gear 7 and the fourth speed gear 8 are designed to rotate together with the input shaft 2 by selective connection of such gears with a sleeve 16a of a second clutch mechanism 16. Similarly, the fifth speed gear 9 are designed to rotate together with the input shaft 2 by selective connection of such gear with a sleeve 17a of a third clutch mechanism 17. With this arrangement, the input shaft 2 is driven through a clutch by engine operation and the rotation of the input shaft 2 is transmitted to the output shaft 3 with the speed of rotation varied. A counter reverse gear 18 is provided on the outer circumference of the sleeve 15a of the first clutch mechanism 1. A reverse idler gear 20 is born by the reverse idler shaft 19 which is rotatably supported by the transmission casing 1 so as to rotate together with the shaft 19 and move in its axial direction. When the reverse idler gear 20 is axially moved and is synchronously meshed with the reverse gear 5 and the counter reverse gear 18, the rotation of the input shaft 2 is transmitted to the output shaft 3 under the reversed state. The rotation of the output shaft 3 is transmitted through a driving gear 21 of the shaft 3 to a differential gear 22 and is thereafter transmitted to a right and left driving shafts 23 and 24. FIG. 1 shows a neutral position of the transmission wherein the rotation of the input shaft 2 is not transmitted to the output shaft 3.

Figure 2:
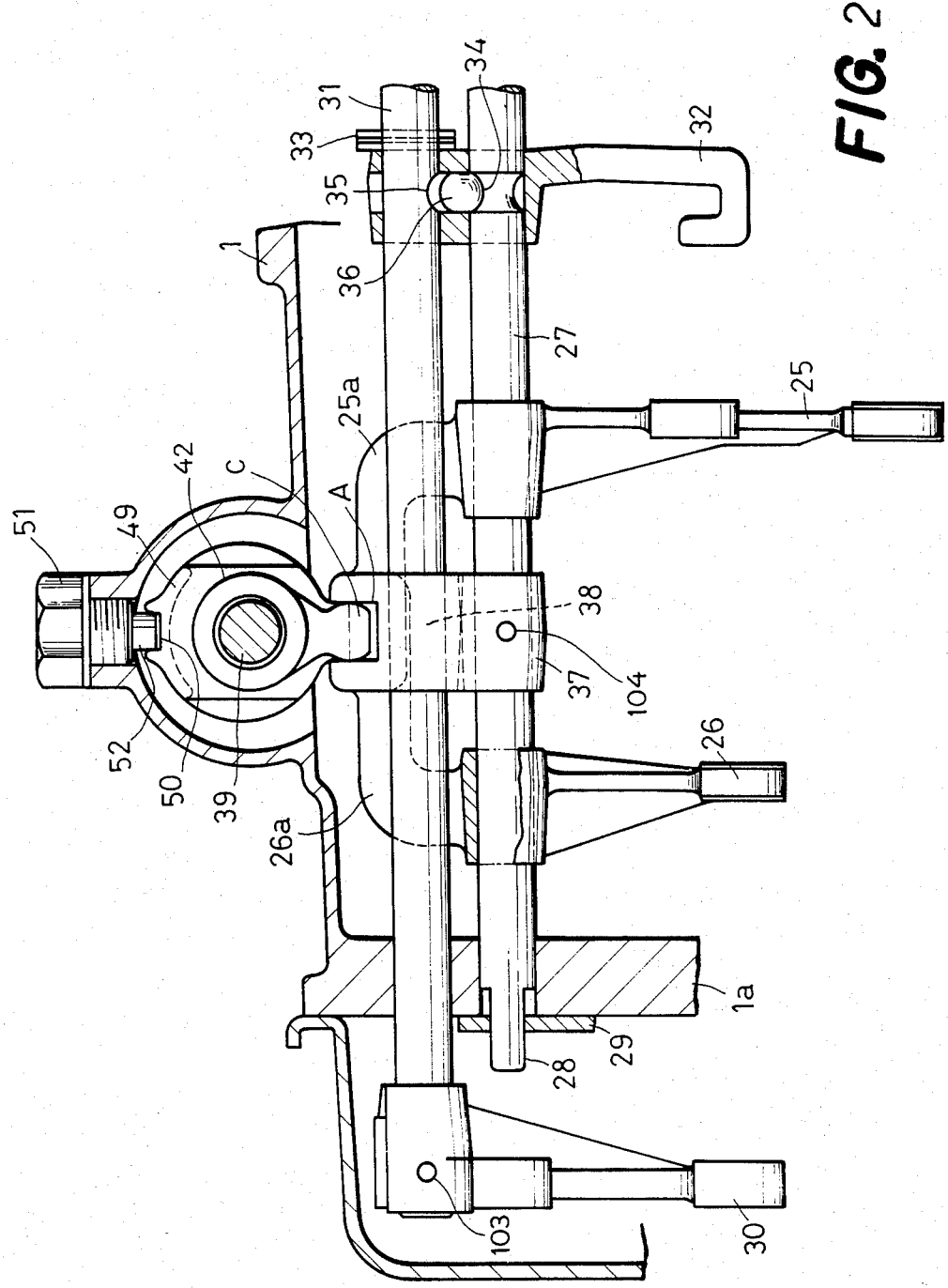
FIG. 2 is a sectional front elevation of the transmission mechanism in FIG. 1 and taken along the line II—II in FIG. 3.
Figure 3:
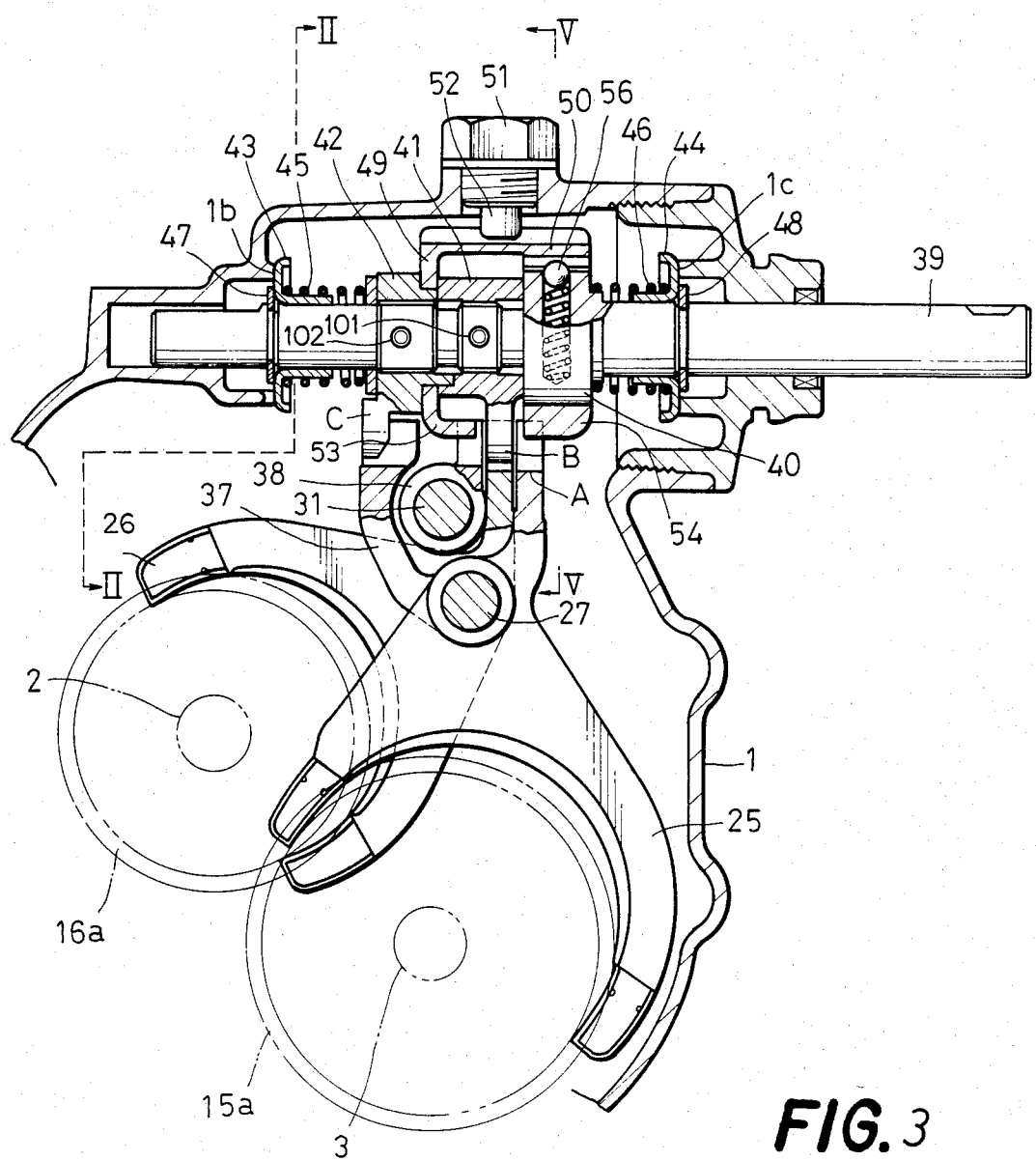
FIG. 3 is a sectional side elevation of the transmission mechanism in FIG. 1.

FIGS. 2 through 5 show the transmission mechanism adapted for carrying out the operation of transmitting the engine rotation and changing the engine speeds by moving the sleeves 15a to 17a of the clutch mechanisms 15 to 17. The novel feature of the preferred embodiment is the mechanism for operating the first clutch mechanism 15 and the second clutch mechanism 16. As shown in FIGS. 2 and 3, first and second shift forks 25 and 26 are engaged with the sleeve 15a of the first clutch mechanism 15 and the sleeve 16a of the second clutch mechanism 16, respectively in such a manner that both of the sleeves 15a and 16a are permitted to rotate and move in its axial direction. The first and second shift forks 25 and 26 are supported by a first fork shaft 27 and adapted to move in its axial direction. The first fork shaft 27 is axially movably born by the transmission casing 1 in parallel relation with the input shaft 2. The left end portion 28 of the first fork shaft 27 is constructed to be locked by the retainer 29 fixed to the intermediate wall 1a of the transmission casing 1 as viewed in FIG. 2. A third shift fork 30 is engaged with the third sleeve 17a of the third clutch mechanism 17 in such a manner that the sleeve 17a is permitted to rotate and move in its axial direction. The third shift fork 30 is secured by pins 103 to a second fork shaft 31. The second fork shaft 31 is axially movably born by the transmission casing 1 in such a manner that it extends through the intermediate wall 1a of the casing 1. The fork shaft 31 is situated in front of and above the first fork shaft 27 or on the left-hand side of and above the first fork shaft 27 as viewed in FIG. 3, and in parallel relation with the fork shaft 27. A reverse shift arm 32 is axially movably fitted to the right end portions of both the fork shafts 27 and 31. The shift arm 32 is connected to the reverse idler gear 20 in such a manner that the idler gear 20 is permitted to rotate and move in its axial direction. The shift arm 32 is restricted to move rightwardly by a stopper pin 33 inserted through the second fork shaft 31. A one-way pin 36 is accommodated in the shift arm 32 and is engaged with grooves 34 and 35 bored into the first and second fork shafts 27 and 31 which grooves are in opposed relation with each other. With this arrangement, when the second fork shaft 31 is moved leftwardly, and as the result, the shift arm 32 is moved leftwardly together with the second fork shaft 31 by the aid of the stopper pin 33, the one-way pin 36 is disengaged from the groove 34 of the fixed first fork shaft 27 and is moved upwardly to engage the groove 35 of the second fork shaft 31. On the other hand, when the second fork shaft 31 is moved to the original position, the shift arm 32 can be moved together with the second fork shaft 31. When the second fork shaft 31 is moved rightwardly or the first fork shaft 27 is moved rightwardly or leftwardly, the one-way pin 36 is engaged with the groove of the unmoved fork shaft and the reverse shift arm 32 remains at the fixed position.

Figure 4:
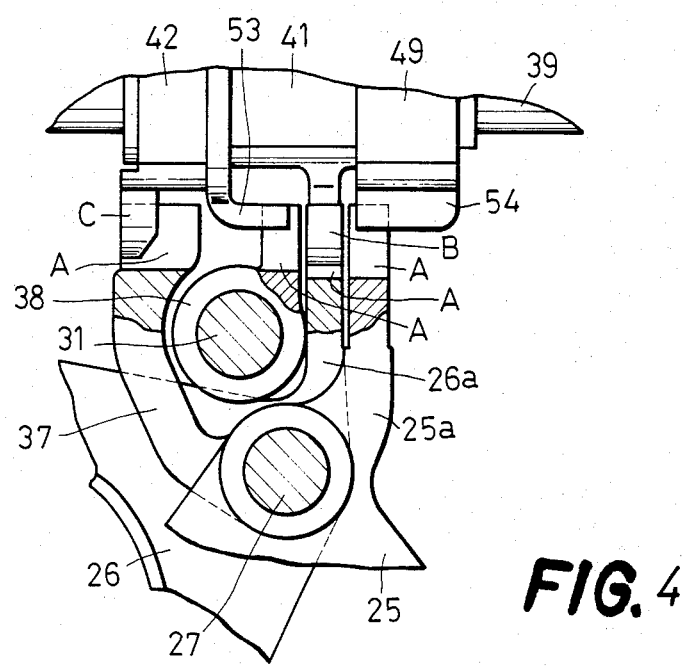
FIG. 4 is an enlarged partially sectional view of the connection between the lever shaft and the fork shaft in FIG. 3.

A first shift head 37 fixedly carries the first fork shaft 27 by pin 104 between the first and second shift forks 25 and 26, and a second shift head 38 fixedly carries the second fork shaft 31 at the near position of the first shift head 37. A head portion 26a integrally formed with the second shift fork 26 is extended at the rear position of the second shift head 38, and a head portion 25a integrally formed with the first shift fork 25 is extended at the rear position of the head portion 26a of the second shift fork 26. The first and second shift heads 37 and 38 and the head portions 25a and 26a are provided with respective recesses A as shown in FIG. 4. The recesses A are arranged in alignment with each other and perpendicularly to each fork shaft 27 and 31 at the neutral position.

Figure 5:
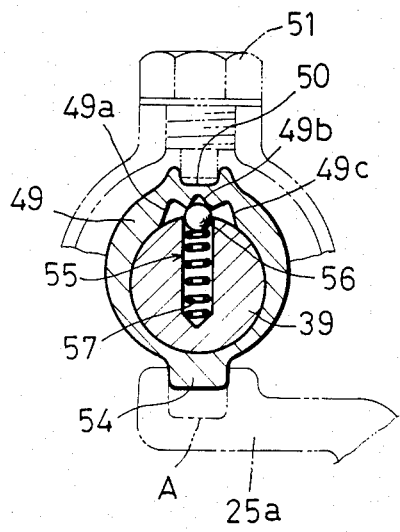
FIG. 5 is a cross-sectional view taken along the line V—V in FIG. 3.

A shift-and-select lever shaft 39 is rotatably and axially movably born by the transmission casing 1 in a manner situating above the first and second fork shafts 27 and 31 and perpendicularly to each fork shaft 27 and 31. The lever shaft 39 is designed to axially move through a remote control mechanism (not shown) by the select operation of a shift lever (not shown) and is designed to rotate through the remote contol mechanism by the shift operation of the shift lever. A larger diametrical portion 40 is formed at the central portion of the lever shaft 39, and a first inner lever 41 and a second inner lever 42 are in sequence fixed by pins 101, 102 on the front side of the larger diametrical portion 40 or on the direct left-hand side thereof as viewed in FIG. 3. A front and rear washers 43 and 44 are axially movably inserted around the lever shaft 39 at the front and rear walls 1b and 1c of the transmission casing 1. A front return spring 45 is received between the front washer 43 and the second inner lever 42, and a rear return spring 46 is similarly received between the rear washer 44 and the larger diametrical portion 40. The washers 43 and 44 are prevented from leaving out by a front and rear snap rings 47 and 48 securely fitted around the lever shaft 39, and abut against the front and rear walls 1b and 1c of the casing 1 to maintain the lever shaft 39 at the neutral position. The first inner lever 41 has a projection B extending downwardly therefrom. The projection B is engaged with the recess A of the second shift fork 26 at the neutral position of the lever shaft 39 as shown in FIG. 4. Similarly, the second inner lever 42 has a projection C (FIGS. 2 and 3) extending downwardly therefrom. The projection C is designed to engage the recess A of the first shift head 37 only when the projection B of the first inner lever 41 is engaged with each recess A of the first shift fork 25 or the second shift fork 26. An interlocking plate 49 is fitted to the lever shaft 39 in a manner surrounding the first inner lever 41 while permitting the rotation of the lever shaft 39. A channel 50 is formed on the upper surface of the interlocking plate 49 along the axial length of the lever shaft 39. A locking bolt 51 is threaded into the upper portion of the casing 1 and the lower end of the bolt 51 is engaged with the channel 50 to prevent the rotation of the interlocking plate 49. Front and rear projections 53 and 54 are formed at the lower end of the interlocking plate 49 with the projection B of the first inner lever 41 interposed therebetween as shown in FIG. 4. The projections 53 and 54 are designed to engage the recess A with which the projections B and C of the inner levers 41 and 42 are not engaged. More specifically, when the lever shaft 39 is in the neutral position, the projections 53 and 54 serve to maintain the second shift head 38 and the first shift fork 25 at the fixed position. When the first inner lever 41 is engaged with the first shift fork 25, the projections 53 and 54 serve to maintain the second shift fork 26 and the second shift head 38 at the fixed position. When the first inner lever 41 is engaged with the second shift head 38, the projections 53 and 54 serve to maintain the first shift head 37, the first shift fork 25 and the second shift fork 26 at the fixed position. As shown in FIG. 5, a temporarily fastening mechanism 55 is fitted to the larger diametrical portion 40 of the lever shaft 39. A detent ball 56 accommodated in the mechanism 55 is designed to engage any one of three recesses 49a to 49c formed on the inner circumference of the interlocking plate 49 by a biasing force of the spring 57. With this arrangement, the lever shaft 39 can remain at the selected rotational position.

In operation, to obtain the first speed, the shift-and-select lever shaft 39 at the neutral position is moved rearwardly or rightwardly as viewed in FIG. 3 against the resilient force of the return spring 46 thereby effecting the select operation, and the projection B of the first inner lever 41 is brought into engagement with the recess A of the first shift fork 25. Then, the lever shaft 39 is rotated in the counter-clockwise direction of FIG. 2 thereby effecting the shift operation, and the first shift fork 25 is moved rightwardly to connect the sleeve 15a of the first clutch mechanism 15 with the counter gear 10 for the first speed gear. As is apparent from this arrangement, the shift operation is effected under the condition that the projection C of the second inner lever 42 is engaged with the recess A of the first shift head 37, so that the first shift fork 25 and the first fork shaft 27 are moved at the same speed in association with the rotation of the lever shaft 39. The rightward movement of lever shaft 39 brings the projection 53 of the interlocking plate 49 into engagement with the respective recesses A of the second shift fork 26 and the second shift head 38, and thus the shift fork 26 and shift head 38 are fixed so that the first shift fork 25 and the first fork shaft 27 are axially moved while the second shift fork 26 and the second shift head 38 are fixed.

To obtain the second speed, the lever shaft 39 is rotated in the opposite direction to that in the case of obtaining the first speed, thereby effecting the shift operation, and the first shift fork 25 is moved leftwardly to connect the sleeve 15a with the counter gear 11 for the second speed gear. In the similar manner as the case of obtaining the first speed, the first shift fork 25 and the first fork shaft 27 are moved at the same speed.

To obtain the third speed, the shift-and-select lever shaft 39 at the neutral position is rotated in the couter-clockwise direction as viewed in FIG. 2 to effect the shift operation, and thus the second shift fork 26 with which the projection B of the first inner lever 41 is engaged is moved rightwardly to connect the sleeve 16a of the second clutch mechanism 16 with the third speed gear 7. As is apparent from this arrangement, the shift operation is effected under the condition that the projection C of the second inner lever 42 is engaged with the recess A of the first shift head 37, so that the second shift fork 26 and the first fork shaft 27 are moved at the same speed in association with the rotation of the lever shaft 39. At this point, the projections 53 and 54 of the interlocking plate 49 are brought into engagement with the respective recesses A of the first shift fork 25 and the second shift head 38, and thus the shift fork 25 and the shift head 38 are fixed so as to move the first shift fork 25 relative to the first fork shaft 27.

To obtain the fourth speed, the lever shaft 39 is rotated in the opposite direction to that in the case of obtaining the third speed, thereby effecting the shift operation, and the second shift fork 26 is moved leftwardly to connect the sleeve 16a with the fourth speed gear 8. In the similar manner as the case of obtaining the third speed, the second shift fork 26 and the first fork shaft 27 are moved at the same speed.

To obtain the fifth speed, the shift-and-select lever shaft 39 at the neutral position is moved forwardly against the resilient force of the return spring 45 to effect the select operation, and thus the projection B of the first inner lever 41 is brought into engagement with the recess A of the second shift head 38. Then, the lever shaft 39 is rotated in the counter-clockwise direction as viewed in FIG. 2 to effect the shift operation, and thus the second fork shaft 31 and the third shift fork 30 are moved rightwardly to connect the sleeve 17a of the third clutch mechanism 17 with the fifth speed gear 9. At this point, the first shift head 37, the first shift fork 25 and the second shift fork 26 are fixed with the result that the projections 53 and 54 of the interlocking plate 49 are brought into engagement with the respective recesses A of the first shift head 37, the first shift fork 25 and the second shift fork 26. At this time, the one-way pin 36 is engaged with the groove 34 of the first fork shaft 27 which is fixed with the first shift head 37, and as the result, the reverse shift arm 32 remains at the fixed position.

In order to put each speed gear position into the neutral position, the above mentioned operation should be reversed in order.

To obtain the reverse gear, the lever shaft 39 is rotated in the opposite direction to that in the case of obtaining the fifth speed, thereby effecting the shift operation, and as the result, the second fork shaft 31 is moved leftwardly and the reverse shift arm 32 is moved together with the fork shaft 31 by the aid of the stopper pin 33 to simultaneously mesh the reverse idler gear 20 with the reverse gear 5 and the counter reverse gear 18. To put the reverse gear position into the neutral position, since the one-way pin 36 is engaged with the groove 35 of the second fork shaft 31 during the shift operation for the reverse gear, the reverse shift arm 32 is returned to the neutral position together with the second fork shaft 31.

Figure 6:
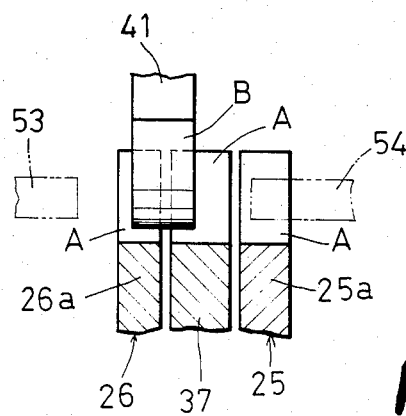
FIG. 6 is an enlarged cross-sectional view of the connection between the lever shaft and the fork shaft according to the second preferred embodiment.

FIG. 6 shows a second preferred embodiment of this invention in which the first shift head 37 is located between the head portion 25a of the first shift fork 25 and the head portion 26a of the second shift fork 26, and the projection B of the first inner lever 41 is effective to engage the shift head 37 and one of the shift forks 25 and 26. According to this embodiment, the second inner lever 42 employed in the first embodiment may be eliminated.

Having thus described the preferred embodiments of the invention it should be understood that numerous structural modifications and adaptations may be restored to without departing from the spirit of the invention.

What is claimed is:

1. A transmission mechanism in a manual transmission comprising a fork shaft axially movably mounted on a transmission casing; a plurality of shift forks supported by and adapted to move along said fork shaft, said shift forks having first recess means at their upper portions arranged in alignment with each other and perpendicularly to said fork shaft in the neutral position of said transmission; a shift-and-select lever shaft mounted on said transmission casing and perpendicularly to said fork shaft, said lever shaft being adapted to axially move and rotate about its axis; a projection means formed with said shift-and-select lever shaft for axially moving said fork shaft and for selectively engaging one of said first recess means of said shift forks by the axial movement of said shift-and-select lever shaft; and means for moving said shift fork selectively engaged with said shift-and-select lever shaft in the axial direction of said fork shaft at the same speed of the axial movement of said fork shaft by the rotation of said lever shaft.

2. The transmission mechanism as defined in claim 1 wherein said means for axially moving said fork shaft is comprised of a shift head fixedly supported by said fork shaft and having a second recess means at its upper portion, said second recess means being brought into alignment with said first recess means of said shift fork in the neutral position of said transmission; and an inner lever fixed about said shift-and-select lever shaft for engaging said second recess means of said shift head.

3. The transmission mechanism as defined in claim 2 wherein said plurality of shift forks are comprised of two adjacent shift forks.

4. The transmission mechanism as defined in claim 3 wherein said shift head is located outside of said two shift forks.

5. The transmission mechanism as defined in claim 3 wherein said shift head is located between said two shift forks.

* * * * *